United States Patent
Okamoto et al.

(10) Patent No.: US 7,094,359 B2
(45) Date of Patent: Aug. 22, 2006

(54) MICRO POWDER AND METHOD FOR PRODUCING THE SAME

(75) Inventors: Satoshi Okamoto, Tsukuba (JP); Manabu Hirakawa, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 26 days.

(21) Appl. No.: 10/386,434

(22) Filed: Mar. 13, 2003

(65) Prior Publication Data

US 2003/0178602 A1 Sep. 25, 2003

(30) Foreign Application Priority Data

Mar. 20, 2002 (JP) .............................. 2002-078341

(51) Int. Cl.
*C09K 19/52* (2006.01)
*C09K 19/32* (2006.01)
*C09K 19/20* (2006.01)
*B32B 15/02* (2006.01)

(52) U.S. Cl. ........................... 252/299.01; 252/299.62; 252/299.66; 252/299.67; 428/402

(58) Field of Classification Search ........... 252/299.01, 252/299.1, 299.2, 299.3, 299.4, 299.5, 299.6, 252/299.62, 299.63, 299.64, 299.67, 299.7, 252/299.66; 428/402
See application file for complete search history.

(56) References Cited

U.S. PATENT DOCUMENTS 3,330,791 A * 7/1967 Mater et al. ............. 428/321.3
4,968,573 A * 11/1990 Kaneko et al. .......... 430/111.32
5,472,649 A * 12/1995 Chang et al. ................. 264/15

FOREIGN PATENT DOCUMENTS

| JP | 63-035816 | * | 2/1988 |
| JP | 04-303848 | * | 10/1992 |
| JP | 06-110251 | * | 4/1994 |

OTHER PUBLICATIONS

English translation of JP 06-110251.*
MSDS for Rucote 915 (from Bayer.com)- updated Sep. 6, 2004 online.*
MSDS for Rucote 103 (from Bayer.com)- updated Sep. 6, 2004 online.*
Gullickson, Richard: "Reference data sheet on intert gases and atmospheres" -www.meridianeng.com/inertgas.html printed Sep. 20, 2004 from a Dec. 1996 submission.*

* cited by examiner

*Primary Examiner*—Shean C. Wu
(74) *Attorney, Agent, or Firm*—Fitch, Even, Tabin & Flannery

(57) ABSTRACT

An object of the present invention is to provide a micro powder capable of producing a thin film with precision thickness. This object is achieved by a micro powder having an average particle size of from 0.5 to 50 μm, obtained by grinding a liquid crystalline polyester having a flow beginning temperature of from 200° C. to 270° C.

16 Claims, No Drawings

MICRO POWDER AND METHOD FOR PRODUCING THE SAME

FIELD OF THE INVENTION

The present invention relates to a micro powder and a method for producing the same.

BACKGROUND OF THE INVENTION

Liquid crystalline polyesters showing optical anisotropy are paid to attention as materials for electronic parts because of an excellent electric insulation property, low hygroscopicity, heat resistance and the like. Recently, because of increasing a demand for downsizing of electric parts, that is, the demand for decreases in weight, thickness, length and size of electronic parts, use of this liquid crystalline polyester as a thin film has been investigated.

As the method of decreasing the thickness of a liquid crystalline polyester film, there are known a powder painting method using a micro powder, and a method of forming a painted film using a solution containing a micro powder dispersed. However, while a liquid crystalline polyester having a high flow beginning temperature shows high elasticity, it is difficult to obtain a thin film of the liquid crystalline polyester by a powder painting method, a method of forming a painted film using a solution containing a micro powder dispersed, or other methods, even if pellets of the liquid crystalline polyester are ground.

SUMMARY OF THE INVENTION

An object of the present invention is to provide a micro powder capable of producing a thin film with precision thickness.

The present inventors have intensively studied to find a micro powder without problems as described above and resultantly found that a micro powder having an average particle size of from 0.5 to 50 μm obtained by mechanically grinding a liquid crystalline polyester having a flow beginning temperature of from 200° C. to 270° C. can produce a thin film with precision thickness, and then completed the invention.

Namely, the present invention provides a micro powder having an average particle size of from 0.5 to 50 μm, obtained by grinding a liquid crystalline polyester having a flow beginning temperature of from 200° C. to 270° C.

DETAILED DESCRIPTION OF THE INVENTION

The liquid crystalline polyester used in the present invention is a liquid crystalline polyester showing optical anisotropy in melting and having a flow beginning temperature of from 200° C. to 270° C., preferably from 230° C. to 270° C., more preferably from 240° C. to 260° C.

When the flow beginning temperature is less than 200° C., the mechanical thickness of an obtained film may be weak and fragile, and when the flow beginning temperature is more than 270° C., it may be difficult to obtain the polyester powder having an average particle size of 50 μm or less.

The flow beginning temperature of the present invention means a temperature at which the melt viscosity shows 48000 poise when a heat-melted polymer is extruded through a nozzle under a load of 100 kgf/cm² at a temperature raising rate of 4° C./min. using a capillary rheometer having a nozzle of an internal diameter of 1 mm and a length of 10 mm.

The liquid crystalline polyester resins used for the present invention include, for example:

(1) a polymer comprising a repeating unit derived from aromatic hydroxycarboxylic acids, a repeating unit derived from aromatic dicarboxylic acids and a repeating unit derived from an aromatic diols, (2) a polymer comprising repeating units derived from different aromatic hydroxycarboxylic acids, (3) a polymer comprising a repeating unit derived from aromatic dicarboxylic acids and a repeating unit derived from aromatic diols, (4) a polymer prepared by reaction of polyesters such as polyethylene terephthalate and aromatic hydroxycarboxylic acids; and the like. It is noted that in place of such aromatic hydroxycarboxylic acids, aromatic dicarboxylic acids or aromatic diols, ester formable derivatives thereof such as derivatives having ester forming property may be used.

The ester formable derivatives of a carboxylic acid may include, for example, those in which a carboxyl group is present in the form of an acid chloride or an acid anhydride so as to promote an ester formation reaction, or those in which a carboxyl group forms an ester with alcohols, ethylene glycol and the like so that a polyester is formed by a transesterification reaction.

The ester formable derivatives of a phenolic hydroxyl group may include, for example, those in which a phenolic hydroxyl group forms an ester with carboxylic acids so that polyester is formed by a transesterification reaction.

Aromatic hydroxycarboxylic acids, aromatic dicarboxylic acids and aromatic diols may also be substituted with an alkyl group such as a methyl group, ethyl group and the like, an aryl group such as a phenyl group and the like, a halogen atom such as chlorine, fluorine and the like, or other groups not disturbing their ester forming property.

Examples of repeating units constituting the liquid crystalline polyester include the following units.

Repeating units derived from aromatic hydroxycarboxylic acids:

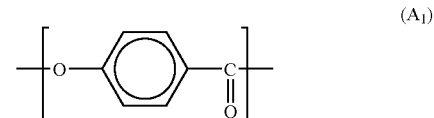

(A₁)

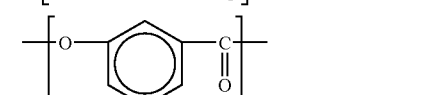

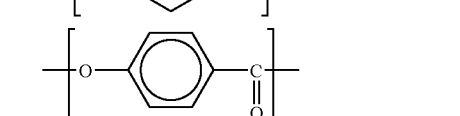

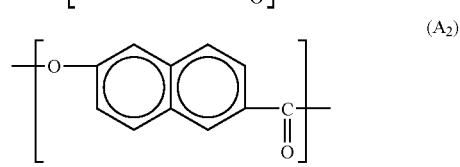

(A₂)

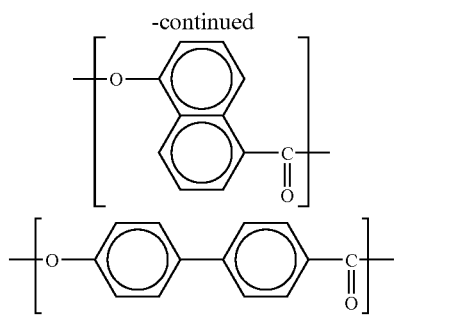

The above-mentioned repeating units may be substituted with a halogen atom or an alkyl group.

Repeating units derived from aromatic dicarboxylic acids:

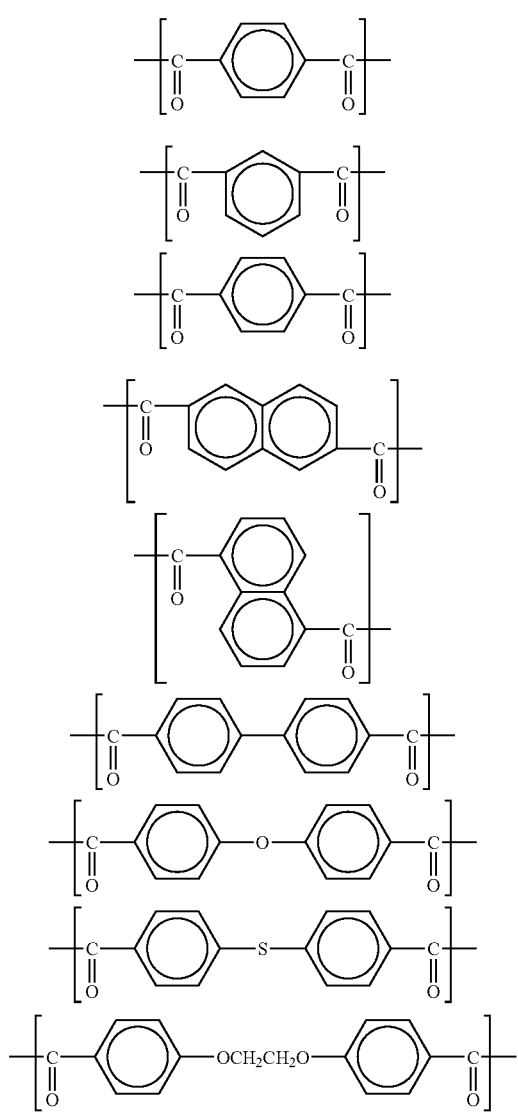

The above-mentioned repeating units may be substituted with a halogen atom, an alkyl group or an aryl group.

Repeating units derived from aromatic diols:

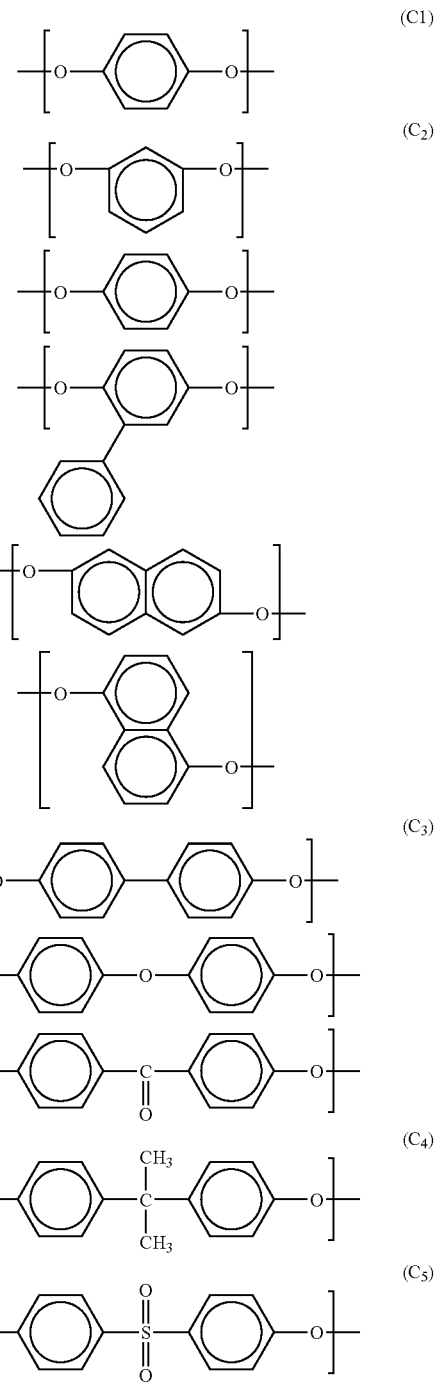

The above-mentioned repeating units may be substituted with a halogen atom, an alkyl group or an aryl group.

In the above-mentioned structure, the alkyl group include alkyl groups having 1 to 10 carbon atoms such as a methyl group, ethyl group, t-butyl group and the like, the aryl group include aryl groups having 6 to 20 carbon atoms such as a phenyl group and the like, and the halogen atom include chlorine, fluorine and the like.

From a viewpoint of good balance of heat resistance, mechanical characteristics, and processibility, preferable are liquid crystallineline polyesters containing at least 30% of the structural repeating unit of the above-described formula $A_1$.

Those having combinations of the repeating units as following (a) to (f) are preferable.
- (a): a combination of ($A_1$), ($B_1$) and ($C_3$), or a combination of ($A_1$), a mixture of ($B_1$) and ($B_2$), and ($C_3$)
- (b): combination (a) in which ($C_3$) is partially or completely substituted by ($C_1$)
- (c): combination (a) in which ($C_3$) is partially or completely substituted by ($C_2$)
- (d): combination (a) in which ($C_3$) is partially or completely substituted by ($C_4$)
- (e): combination (a) in which ($C_3$) is partially or completely substituted by a mixture of ($C_4$) and ($C_5$)
- (f): combination (a) in which ($A_1$) is partially substituted by ($A_2$)

From the viewpoint of a liquid crystalline property, the preferable liquid crystalline polyesters are those comprising 30 to 80 mol % of a repeating unit derived from p-hydroxybenzoic acid ($A_1$), 10 to 35 mol % of a repeating unit derived from at least one compound selected from the group consisting of hydroquinone ($C_1$) and 4,4'-dihydroxybiphenyl ($C_3$), and 10 to 35 mol % of a repeating unit derived from at least one compound selected from the group consisting of terephthalic acid ($B_1$), isophthalic acid ($B_2$) and naphthalene dicarboxylic acid ($B_3$).

From the standpoint of balance of heat resistance and rigidity, the further preferable liquid crystalline polyesters are those comprising 40 to 70 mol % of a repeating unit derived from p-hydroxybenzoic acid ($A_1$), 15 to 30 mol % of a repeating unit derived from 4,4'-dihydroxybiphenyl ($C_3$), and 15 to 30 mol % of a repeating unit derived from at least one compound selected from the group consisting of terephthalic acid ($B_1$) and isophthalic acid ($B_2$).

The method of producing the liquid crystalline polyester used in the present invention is not particularly limited and may include, for example, a method in which at least one compound selected from the group consisting of aromatic hydroxycarboxylic acids and aromatic diols is acylated with a fatty anhydride to obtain an acylated compound, and, by transesterifaction between the acylated compound and at least one compound selected from the group consisting of aromatic hydroxycarboxylic acids and aromatic dicarboxylic acids, the liquid crystalline polyester is produced.

The fatty acid anhydrides used in the present invention include, for example, lower fatty anhydrides such as acetic anhydride, propionic anhydride and the like, and acetic anhydride is preferably used from the viewpoints of its availability and easy handling.

The use amount of a fatty acid anhydride in acylating a phenolic hydroxyl group is preferably from 1.05 to 1.1 times equivalent to that of the phenolic hydroxyl group.

The acylation reaction is conducted preferably at about 130 to about 180° C. for about 30 minutes to about 20 hours, more preferably at about 140 to about 160° C. for about 1 to about 5 hours.

The transesterification (polycondensation) reaction is preferably conducted while raising temperature at a rate of 0.1 to 50° C./min. in the range from about 130 to about 400° C., more preferably conducted while raising temperature at a rate of 0.3 to 5° C./min. in the range from about 150 to about 350° C.

After the transesterification (polycondensation) reaction, solid phase polymerization may also be further conducted for improving various physical properties.

For obtaining a flow beginning temperature of a liquid crystalline polyester from 200 to 270° C., it is preferable that the acylation reaction and transesterification reaction are conducted at 100° C. to 350° C. under normal pressure in an inert gas atmosphere, it is more preferable that the acylation reaction and transesterification reaction are conducted at 150° C. to 330° C. under normal pressure in an inert gas atmosphere, and it is further preferable that the transesterification reaction is conducted at temperatures of 300° C. or more for 1 hour or more.

The micro powder of the present invention can be obtained by grinding (sometimes refer to fine grinding in order do distinguish coarse grinding mentioned below) a liquid crystalline polyester showing optical anisotropy in melting and having a flow beginning temperature of from 200° C. to 270° C. The grinding is preferably mechanical grinding.

When the average diameter of the liquid crystalline polyester is 1 cm or more such as in the form of pellet, sheet, block and the like, a micro powder can be obtained by conducting coarse grinding before fine grinding, if necessary.

The coarse grinding method include methods using, for example, a jaw crusher, gyratory crusher, cone crusher, roll crusher, impact crusher, hammer crusher, cracking cutter and the like.

The fine grinding method include methods using a rod mill, ball mill, vibration rod mill, vibration ball mill, pan mill, roller mill, impact mill, discoid mill, stirring grinding mill, fluid energy mill, jet mill and the like.

The coarse grinding and fine grinding conditions are not particularly limited, and it is preferable to conduct grinding under dry condition since a method conducted under wet condition may cause hydrolysis.

In the case of conducting coarse grinding, the size of liquid crystalline polyester may be reduced to the size capable of being fed to a jet grinder and the like for conducting fine grinding by coarse grinding, and it is preferable to reduce the size having an average particle size of about 0.5 to about 5 mm from the viewpoint of handling.

When a jet grinder is used for example, although the grinding conditions may depend on the type of grinder employed, it is preferable to conduct grinding at a nozzle pressure of 0.5 to 1 MPa and a treating speed of 0.5 kg/Hr or more from the viewpoint of productivity.

A micro powder obtained above may be preferably further heat-treated before use.

The heat-treatment method include, for example, a method in which the micro powder is stirred at a temperature of about 150° C. to about 350° C. in a solvent of high boiling point such as a mixture of diphenyl and diphenyl ether, or diphenylsulfone and the like, then, the solvent of high boiling point is removed, or a method in which the micro powder is treated at a temperature of about 150° C. to about 350° C. under an inert gas atmosphere or under reduced pressure for about 1 to about 20 hours.

When the heat-treatment is conducted at a temperature of less than 150° C., an effect of heat-treatment may be small, and when heat-treatment is conducted at a temperature of over 350° C., a decomposition reaction may occur.

The heat-treatment apparatus include, for example, a drier, reactor, inert oven, mixer, electric oven and the like.

When the micro powder is heat-treated, it is preferable to appropriately set the temperature-raising rate and treatment temperature of the heat-treatment conditions so that liquid crystalline polyester particles are not fused. When fusion occurs, producing a thin film may be disturbed. When fusion occurs after heat-treatment and particle size increases, before use for producing a thin film, the particle size after heat-treatment is reduced again to the same size as before heat-treatment by grinding method such as crushing and the like, preferably by mechanical grinding method.

As the heat treatment atmosphere, an inert gas atmosphere or reduced atmosphere is preferable, and the inert gas includes, for example, nitrogen, helium, argon, carbonic acid gas and the like.

The flow beginning temperature of the micro powder obtained by heat-treatment is preferably from 280° C. to 420° C. since then heat resistance and mechanical properties are excellent, and more preferably from 310° C. to 390° C. When the flow beginning temperature is lower than 280° C., out gas may occur, and when the flow beginning temperature is over 420° C., a decomposition reaction may occur and the film strength tends to lower.

The particle size of the resulting micro powder is from 0.5 to 50 μm, more preferably from 0.5 to 30 μm, further preferably from 0.5 to 10 μm.

The method of producing a film (thin membrane) using the resulted micro powder includes a powder painting method, a method using a dispersion solution, and the like.

The powder painting method is, for example, a method of baking at a temperature of about 300 to about 420° C. for about 10 to about 40 minutes.

The method using a dispersion solution is, for example, a method in which a solution prepared by dispersing a micro powder in water or an organic solvent so as to give a solid content of 10% or more is applied on a substrate, then, water or an organic solvent is dried.

The organic solvent is not particularly limited, and includes a general organic solvent such as methyl ethyl ketone, methyl isobutyl ketone, isopropanol, toluene and the like.

The micro powder of the present invention can be used as a powder paint for electrostatic painting, or an organic filler for insulation.

EXAMPLES

The present invention will be described with the reference to examples, however the present invention is not limited to these examples.

Production Example 1

Into a reactor equipped with a stirrer, torque meter, nitrogen gas introducing tube, thermometer and reflux condenser was charged 911 g (6.6 mol) of p-hydroxybenzoic acid, 409 g (2.2 mol) of 4,4'-dihydroxybiphenyl, 274 g (1.65 mol) of terephthalic acid, 91 g (0.55 mol) of isophthalic acid and 1235 g (12.1 mol) of acetic anhydride. The atmosphere in the reactor was replaced by a nitrogen gas, then, the mixture was heated up to 150° C. over 15 minutes under a nitrogen gas flow, and refluxed for 3 hours while maintaining the temperature.

Thereafter, the mixture was heated up to 300° C. over 2 hours and 50 minutes while distilling the by-produced acetic acid and unreacted acetic anhydride, and a point at which increase in torque is recognized was regarded as the end of the reaction, and the content in melted condition was taken out into a bat. The yield of the resulted liquid crystalline polyester was 1430 g. The taken out liquid crystalline polyester was ground to coarse particles of 1 mm or less by Orient Mill VM-16 cutter mill manufactured by Seishin Enterprise Co., Ltd., then, the flow beginning temperature was measured to be 239° C.; and optical anisotropy was manifested in melted condition at temperatures of 280° C. or more. The average particle size of the coarse particles was 500 μm.

Production Example 2

The coarse particles obtained in Production Example 1 (average particle size: 500 μm) were heated from room temperature to 250 ° C. under a nitrogen atmosphere over 1 hour, and heated from 250° C. to 285° C. over 5 hours, and heat-treated at 285° C. for 3 hours, then, taken out. The flow beginning temperature of the resulted coarse particles was 327° C.

Example 1

The coarse particles having a flow beginning temperature of 239° C. obtained in Production Example 1 (average particle size: 500 μm) were finely ground by STJ-200 single track jet mill manufactured by Seishin Enterprise Co., Ltd., resulting in a micro powder of a liquid crystalline polyester having an average particle size of 5.2 μm. The resulted micro powder was heated from room temperature up to 250° C. under a nitrogen atmosphere over 1 hour, heated from 250° C. to 292° C. over 5 hours, and heat-treated at 292° C. for 3 hours, then, taken out. The flow beginning temperature of the resulted micro powder was 326° C. Using the resulted micro powder, powder painting was performed under baking conditions of 370° C. for 20 minutes, resulting in a film having a thickness of 50 μm and film thickness deviation being ±10% or less.

Comparative Example 1

The coarse particles having a flow beginning temperature of 327° C. obtained in Production Example 2 (average particle size: 500 μm) were finely ground by single track jet mill manufactured by Seishin Enterprise Co., Ltd., resulting in an average particle size of 450 μm. As a result, a membrane having a membrane thickness of 50 μm was not able to obtained by powder painting.

According to the present invention, a micro powder capable of producing a thin film with excellent precision can be provided.

What is claimed is:

1. A micro powder having an average particle size of from 0.5 to 50 μm, obtained by grinding a liquid crystalline polyester having a flow beginning temperature of from 200° C. to 270° C., wherein said liquid crystalline polyester is at least one selected from the group consisting of:
  (i) a polymer consisting essentially of a repeating unit derived from aromatic hydroxycarboxylic acids, a repeating unit derived from aromatic dicarboxylic acids and a repeating unit derived from aromatic diols,
  (ii) a polymer consisting essentially of repeating units derived from different aromatic hydroxycarboxylic acids,
  (iii) a polymer prepared by reaction of polyethylene terephthalate with aromatic hydroxycarboxylic acids, and
  (iv) at least one polymer according to (i), (ii), or (iii) provided that in place of said aromatic hydroxycarboxylic acids, aromatic dicarboxylic acids and aromatic diols, ester derivatives thereof are used.

2. The micro powder according to claim 1, wherein the micro powder has a flow beginning temperature of from 280° C. to 420° C.

3. The micro powder according to claims 1 or 2, wherein the average particle size is from 0.5 to 30 μm.

4. The micro powder according to claim 3, wherein the average particle size is from 0.5 to 10 μm.

5. The micro powder according to claim 1, wherein the liquid crystalline polyester is a liquid crystalline polyester consisting essentially of a repeating unit derived from aromatic hydroxycarboxylic acids, a repeating unit derived from aromatic diols and a repeating unit derived from dicarboxylic acids.

6. The micro powder according to claim 1, wherein the liquid crystalline polyester is obtained by a method comprising acylatation of at least one compound selected from the group consisting of aromatic hydroxycarboxylic acids and aromatic diols with a fatty acid anhydride to obtain an acylated compound, and transesterifaction of the acylated compound and at least one compound selected from the group consisting of aromatic hydroxycarboxylic acids and aromatic dicarboxylic acids.

7. The micro powder according to claim 5, wherein the liquid crystalline polyester is a liquid crystalline polyester comprising a repeating unit derived from p-hydroxybenzoic acid is from 30 to 80 mol %, the repeating unit derived from 4,4'-dihydroxybiphenil is from 10 to 35 mol % and the repeating unit derived from at least one compound selected from the group consisting of terephthalic acid, and isophthalic acid is from 10 to 35 mol %.

8. A method for producing a micro powder having an average particle size of from 0.5 to 50 μm comprising grinding a liquid crystalline polyester having a flow beginning temperature of from 200° C. to 270° C. and obtaining the micro powder, wherein said liquid crystalline polyester is at least one selected from the group consisting of:
  (i) a polymer consisting essentially of a repeating unit derived from aromatic hydroxycarboxylic acids, a repeating unit derived from aromatic dicarboxylic acids and a repeating unit derived from aromatic diols,
  (ii) a polymer consisting essentially of repeating units derived from different aromatic hydroxycarboxylic acids,
  (iii) a polymer prepared by reaction of polyethylene terephthalate with aromatic hydroxycarboxylic acids, and
  (iv) at least one polymer according to (i), (ii), or (iii) provided that in place of said aromatic hydroxycarboxylic acids, aromatic dicarboxylic acids and aromatic diols, ester derivatives thereof are used.

9. The method for producing a micro powder according to claim 8 further comprising heat-treating in an inert atmosphere after grinding.

10. The method for producing a micro powder according to claim 9 further comprising grinding after heat-treating.

11. The method for producing a micro powder according to any of claims 8–10, wherein the liquid crystalline polyester is obtained by a method comprising acylation of at least one compound selected from the group consisting of aromatic hydroxycarboxylic acids and aromatic diols with a fatty anhydride to obtain an acylated compound, and transesterifaction of the acylated compound and at least one compound selected from the group consisting of aromatic hydroxycarboxylic acids and aromatic dicarboxylic acids.

12. The method for producing a micro powder according to any of claims 8–10, wherein the liquid crystalline polyester is a liquid crystalline polyester consisting essentially of a repeating unit derived from aromatic hydroxycarboxylic acids, a repeating unit derived from aromatic diols and a repeating unit derived from dicarboxylic acids.

13. The method for producing a micro powder according to claim 12, wherein a repeating unit derived from p-hydroxybenzoic acid is from 30 to 80 mol %, the repeating unit derived from 4,4'-dihydroxybiphenyl is from 10 to 35 mol % and the repeating unit derived from at least one compound selected from the group consisting of terephthalic acid, and isophthalic acid is from 10 to 35 mol %.

14. The micro powder according to claim 1, wherein said liquid crystalline polyester has a flow beginning temperature of from 230° C. to 270° C.

15. The method for producing a micro powder according to claim 8, wherein said liquid crystalline polyester has a flow beginning temperature of from 230° C. to 270° C.

16. The micro powder according to claim 8, wherein said micro powder has a flow beginning temperature of 280° C. to 420° C.

* * * * *